US007804619B2

(12) United States Patent
Kubota

(10) Patent No.: US 7,804,619 B2

(45) Date of Patent: Sep. 28, 2010

(54) ADJUSTMENT OF PRINT POSITION IN PRINT CONTROLLER

(75) Inventor: Eiji Kubota, Nagano-ken (JP)

(73) Assignee: Seiko Epson Corporation, Tokyo (JP)

(*) Notice: Subject to any disclaimer, the term of this patent is extended or adjusted under 35 U.S.C. 154(b) by 2130 days.

(21) Appl. No.: 10/668,450

(22) Filed: Sep. 22, 2003

(65) Prior Publication Data

US 2004/0119991 A1 Jun. 24, 2004

(30) Foreign Application Priority Data

Sep. 24, 2002 (JP) ............................ 2002-277781

(51) Int. Cl.
*G06K 15/10* (2006.01)

(52) U.S. Cl. ....................... 358/1.5; 358/1.15; 101/485

(58) Field of Classification Search ................ 358/1.15, 358/1.5; 101/485, 486
See application file for complete search history.

(56) References Cited

U.S. PATENT DOCUMENTS

| | | | | | |
|---|---|---|---|---|---|
| 5,337,668 | A | * | 8/1994 | Matsuoka et al. | 101/481 |
| 5,560,297 | A | * | 10/1996 | Ford | 101/486 |
| 5,699,742 | A | * | 12/1997 | Ahrens et al. | 101/486 |
| 5,927,208 | A | * | 7/1999 | Hagstrom et al. | 101/486 |
| 6,019,151 | A | * | 2/2000 | Wen et al. | 156/387 |
| 6,026,172 | A | * | 2/2000 | Lewis et al. | 382/106 |
| 6,074,031 | A | * | 6/2000 | Kahle | 347/4 |
| 6,202,550 | B1 | * | 3/2001 | Lee et al. | 101/38.1 |
| 6,788,431 | B1 | * | 9/2004 | Yamaguchi | 358/1.9 |
| 7,038,811 | B1 | * | 5/2006 | Haikin | 358/1.9 |
| 2002/0145614 | A1 | * | 10/2002 | Van Valer | 345/629 |
| 2003/0051615 | A1 | * | 3/2003 | Denoue et al. | 101/45 |
| 2004/0011231 | A1 | * | 1/2004 | Hall et al. | 101/327 |
| 2004/0036731 | A1 | * | 2/2004 | Ready et al. | 347/19 |

FOREIGN PATENT DOCUMENTS

| | | |
|---|---|---|
| JP | 10-278224 | 10/1998 |
| JP | 2000-339916 | 12/2000 |

OTHER PUBLICATIONS

Abstract of Japanese Patent Publication No. 10-278224, Pub. Date: Oct. 20, 1998, Patent Abstracts of Japan.

Abstract of Japanese Patent Publication No. 2000-339916, Pub. Date: Dec. 8, 2000, Patent Abstracts of Japan.

* cited by examiner

*Primary Examiner*—David K Moore
*Assistant Examiner*—Benjamin O Dulaney
(74) *Attorney, Agent, or Firm*—Martine Penilla & Gencarella, LLP

(57) ABSTRACT

The CD-R print system 10 has a shape identical to the CD-R and the like, and the scale marks are printed on the adjustment medium AM with the base line BL previously printed thereon. The user inputs portions of the scales overlapping with the base line BL to the CD-R print system 10 via the user interface. Then, the CD-R print system 10 determines an amount of misalignment of print position based on the input information. The CD-R print system 10 reflects this amount of misalignment to generate print data. Such CD-R print system 10 enables the print position to be readily adjusted with accuracy without using a rule or the like.

2 Claims, 8 Drawing Sheets

ADJUSTMENT OF PRINT POSITION IN PRINT CONTROLLER

BACKGROUND OF THE INVENTION

1. Field of the Invention

This present invention relates to a technique for adjusting a print position when printing on a label surface of an electronic information recording medium or another printing medium.

2. Description of the Related Art

Recently, a printing apparatus is available that can directly print characters or images on a label surface of CD-R and the like. A user uses such printing apparatus to print a desired design on the label surface.

Typically, when printing on the label surface, the CD-R and the like are set on a predetermined tray to be printed by the printing apparatus (see FIG. 1). A printing misalignment as shown in FIG. 2, however, may occur due to a misalignment of a position on which the CD-R is set, or a gap that appears between the tray and an edge guide, for example. A hatched portion in FIG. 2 shows a range of the printed image. In the prior art, the user measures an amount of such misalignment with a rule and then input the measurement into a computer to fine-adjust the print position.

The technique is disclosed in JAPANESE PATENT LAID-OPEN GAZETTE No. 10-278224 that relates to adjustment of print position on performing multi-color print on a disk, and the technique is disclosed in JAPANESE PATENT LAID-OPEN GAZETTE No. 2000-339916 that relates to an edit of a label image printed on a surface of an optical disk.

However, it is troublesome and complicated for the user to measure with a rule. Furthermore, it is very difficult to adjust with accuracy of 1 mm or less with a rule.

The invention is made in view of these problems and thus the objective of the invention is to readily adjust a print position with more accuracy when directly printing on the label surface of CD-R and the like.

SUMMARY OF THE INVENTION

In order to solve at least part of the above problems, a print controller of the invention is configured as follows:

A print controller for determining an amount of misalignment of print position when directly printing on a label surface of an electronic information recording medium, the print controller including:

a marker print unit for controlling a printing apparatus to print a marker at a predetermined position of an adjustment medium on which a base line is previously printed to determine the amount of misalignment and which has a shape identical to the electronic information recording medium;

an input unit for inputting from a user at least two portion specifying information for specifying portions where the base line and the marker have a predetermined positional relationship; and a misalignment amount determination unit for determining the amount of misalignment based on the positional relationship between an absolute position at which the base line should be located and the portions specified by the portion specifying information.

The electronic information recording medium used by the invention is a recording medium which can record electronic information and onto whose label surface a print can be directly applied, for example, CD-R/RW, DVD-R/RW/RAM and the like. Most of such recording media are in the form of a disk, but they are not limited to the shape and various-shaped recording media can be used, for example, a business card-shaped CD-R, a heart-shaped CD-R and the like, which are distributing recently. Furthermore, the invention may be applied to, for example, flexible disks, minidisks and memory cards such as compact flash (registered trademark) and smart media (trademark), as long as a print can be directly applied onto their label surface.

The adjustment medium may include a model of the electronic information recording medium, for example, a cardboard that imitates the shape of CD-R and the like. Of course, the electronic information recording medium itself may be used.

The base line may be, for example, a circle or a straight line. The portion where the base line and the marker have the predetermined positional relationship may be, for example, a portion at which the base line overlaps with the marker or a portion at which the base line is closest to the marker. In addition, it may be a position at which the base line intersects with the marker.

The print controller of the invention enables an amount of misalignment to be readily determined without using a rule and the like. Therefore, using this amount of misalignment to adjust the print position enables to print with accuracy. Although two portion specifying information are sufficient to determine a two-dimensional misalignment, inputting three or more portion specifying information enables an amount of misalignment to be determined with more accuracy.

In the print controller of the invention, one of the base line and the marker may include a circle and the other may include scale marks printed at predetermined intervals on at least two axes that are directed from the center of the adjustment medium to the circumference of the circle and differ in direction.

Namely, it is possible to configure so that the circle is previously printed as "base line" on the adjustment medium and then the scale is printed as "marker" or so that the scale is previously printed as "base line" on the adjustment medium and then the circle is printed as "marker."

Where the axes may include two axes directed from the center of the adjustment medium to a x-direction and a y-direction that are reference directions for determining the amount of misalignment. Furthermore, scale marks on an axis directed to a direction other than the reference directions may differ in distance from the center of the adjustment medium by a predetermined amount relative to the scale marks on the axes directed to the x-direction and the y-direction. The shift amount can be a unit of 1 mm or less that cannot be directly measured with a rule, for example, the unit of 0.1 mm is preferable. Although there is a limitation in fineness of the scale marks printed on the single axis, the axes with such shifted scale marks enables this problem to be solved. Therefore, it is preferable to provide more axes. Such configuration enables the scale marks to be read with fineness and thus the amount of misalignment to be determined with accuracy.

Furthermore, when the direction of the determined amount of misalignment is not identical to the x direction or the y direction that is a reference direction for determining the amount of misalignment, the misalignment amount determination unit resolves the amount of misalignment into its x-component and y-component to determine the x-component and the y-component. This enables the print position to be readily adjusted.

Furthermore, in another aspect of the base line and the marker, one of the base line and the marker may include two straight lines in the x direction and in the y direction and the other may include scale marks arranged at predetermined intervals on a line that intersects with each of the straight lines at a predetermined angle. Such aspect is effective for the case that the electronic information recording medium is in the form of a business card.

In addition, the print controllers of the various aspects described above may further include a print data generation unit for generating print data that reflects the amount of misalignment determined by the misalignment amount determination unit and is then output to the printing apparatus. This enables the print position to be adjusted even if the printing apparatus do not have a function of correcting a misalignment of print position.

The invention can be applied to adjustment of print position when printing on a printing medium other than the electronic information recording medium.

Therefore, the print controller of the invention may be configured to include:

a marker print unit for controlling the printing apparatus to print a predetermined marker on an adjustment medium on which a base line is previously printed to determine an amount of misalignment;

an input unit for inputting positional relationship specifying information that represents positional relationships between the base line and the marker on at least two positions based on an operation of a user; and a misalignment amount determination unit for determining the amount of misalignment based on the positional relationships.

Such print controller enables an amount of misalignment to be relatively readily determined by inputting the positional relationship specifying information.

In this aspect, for example, at least one of the base line and the marker may be provided with scale marks for specifying the positional relationship so that the positional relationship specifying information is specified based on these scale marks. This enables the positional relationship to be more readily specified. The various base lines and markers described in connection with the adjustment of print position on the electronic information recoding medium are applied to this aspect.

Alternatively, the invention may be configured as a printing apparatus that includes:

a misalignment amount input unit for inputting the amount of misalignment determined by any of the print controllers of the above-mentioned various aspects;

a print data input unit for inputting print data to be printed; and a print unit for correcting a print position of the print data based on the amount of misalignment and then printing.

This configuration enables the printing apparatus to adjust the print position based on the amount of misalignment input from the print controller. The correction can be performed by control of ink eject timing on the main scan and adjustment of a raster with which the printing operation is started. In the other instance where the printing apparatus has a function of performing the halftone process for the input print data, the correction can be also performed by generating the image data where the entire image is shifted based on the input amount of misalignment and then performing the halftone process.

The invention can be implemented as aspects such as a misalignment amount determination method or a computer program for using a computer to determine an amount of misalignment of print position when directly printing on the label surface of the electronic information recording medium, a computer-readable recording medium with such program stored therein and the like as well as the aspects of the print controller and the printing apparatus described above. The computer-readable recording medium may include various media such as flexible disk, CD-ROM, DVD-ROM, magneto-optics disk, IC card, hard disk and the like.

DESCRIPTION OF THE PREFERRED EMBODIMENTS

Embodiments of the invention are described in the following sequence.

A. First Embodiment (A1) General Configuration of CD-R Print System (A2) Process for Determining Amount of Misalignment B. Second Embodiment C. Modifications

A. First Embodiment (A1) General Configuration of CD-R Print System

Figure 1:
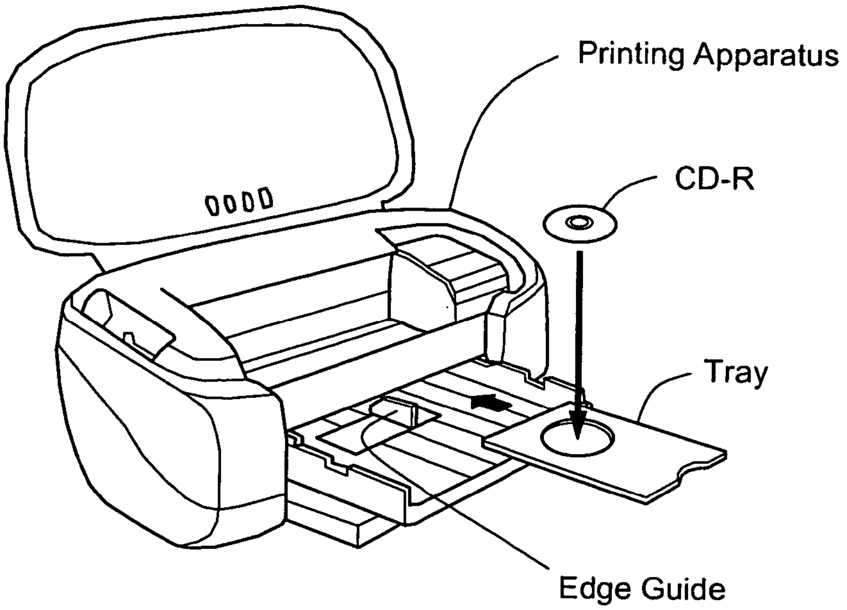
FIG. 1 is a schematic that shows a procedure of setting a CD-R on a tray and then printing thereon.
Figure 2:
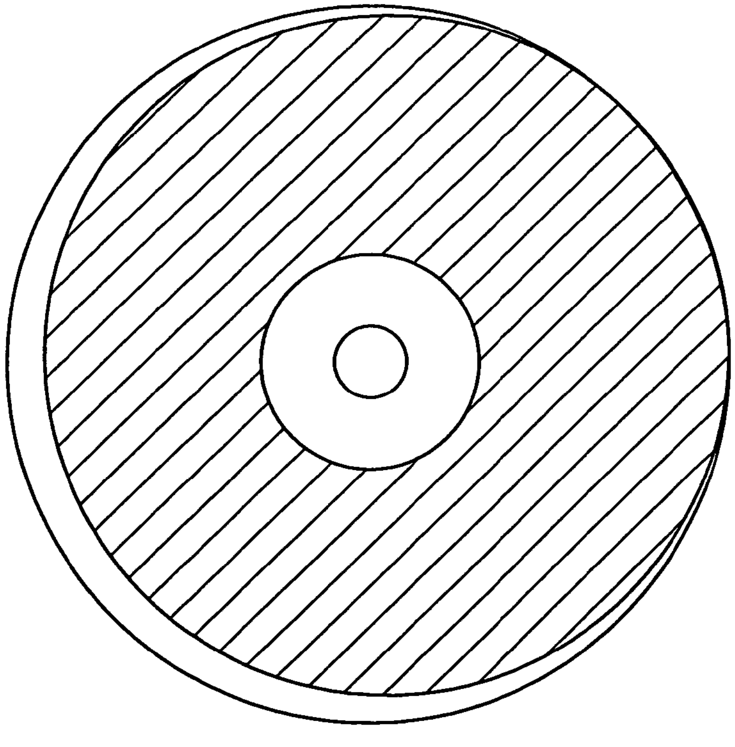
FIG. 2 is a schematic that shows a printing misalignment on a label surface.
Figure 3:
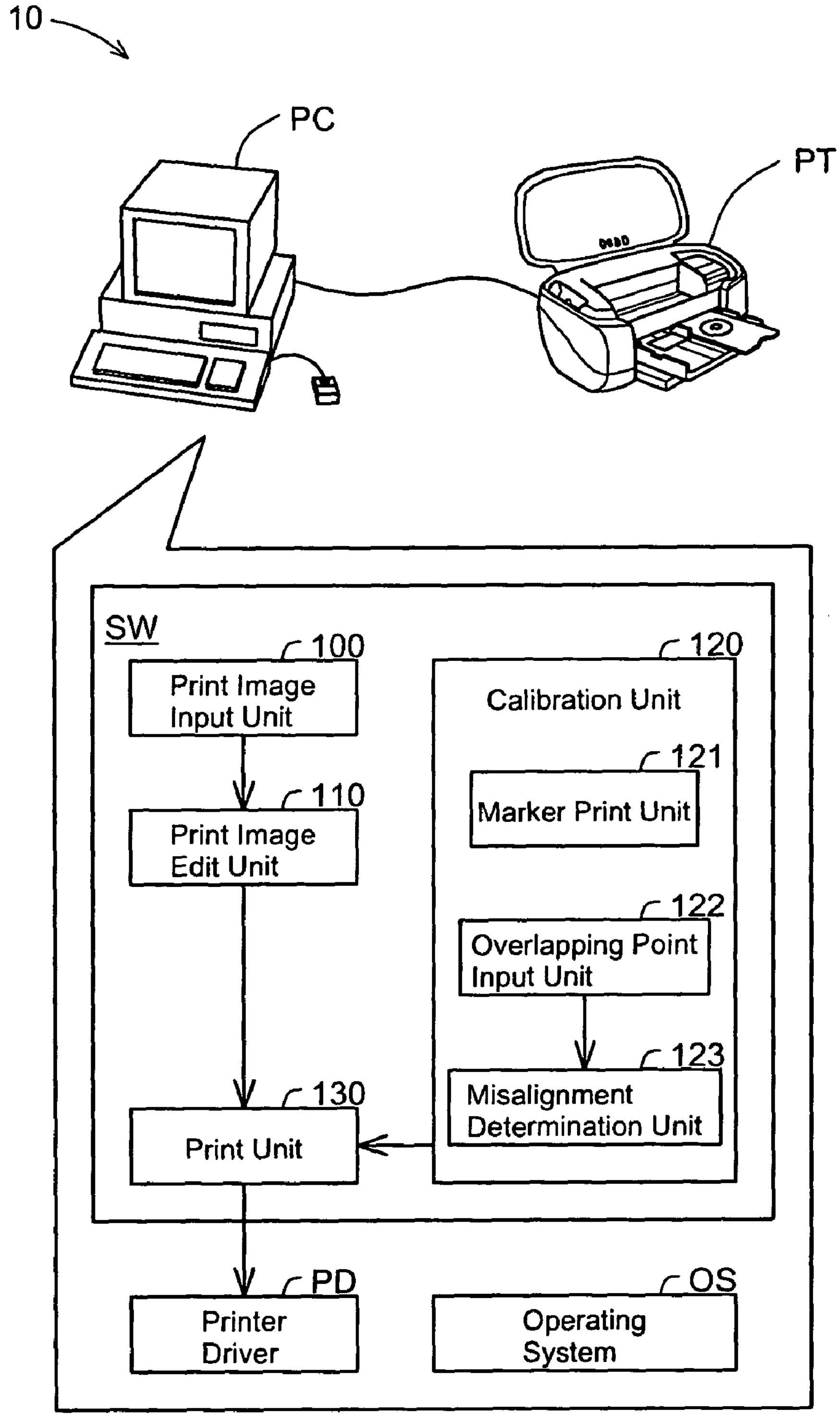
FIG. 3 is a schematic that shows a general configuration of a CD-R print system 10.

FIG. 3 is a schematic that shows a general configuration of a CD-R print system 10 as the embodiment. The CD-R print system 10 is a system that directly prints on label surfaces of various recording media for recording electronic information (hereinafter referred to as "CD-R and the like") such as CD-R, CD-RW, DVD-R/RW/RAM, and includes a personal computer PC and an inkjet printer PT. The personal computer PC is connected with the inkjet printer PT via a USB interface.

The inkjet printer PT has a function of directly printing on the label surface of CD-R and the like. On printing, the user mounts the CD-R and the like on a predetermined tray and sets it to a paper feed slot of the printer PT. It is preferable that multiple types of trays are provided according to shapes of CD-R and the like. For example, when printing on the business card-shaped, heart-shaped CD-R and the like which are distributing recently, the user uses the tray corresponding to its shape to print on the CD-R.

The personal computer PC is a general-purpose computer that includes a CPU, a RAM, a hard disk, a monitor and the like, and the hard disk has an operating system OS, CD-R print software SW, a printer driver PD and the like installed therein.

The CD-R print software SW edits images and characters to be printed on the label surface of CD-R and the like and adjusts their print position. In the lower part of FIG. 3, a block configuration of the CD-R print software SW is shown. The CD-R print software SW includes a print image input unit 100, a print image edit unit 110, a calibration unit 120 and a print unit 130.

The print image input unit 100 inputs an image to be printed on the label surface of CD-R and the like from a hard disk, a digital still camera, a scanner and the like, as instructed by the user. The image edit unit 110 performs image processing such as trimming and tone correction, arrangement of characters onto the image, and the other processing.

The print unit 130 generates the print data of such edited image and then outputs it to the printer driver PD. On generating the print data, the print unit 130 reflects the amount of misalignment of print position that is determined by the calibration unit 120 described later. When the misalignment of print position, for example, by 2 mm rightward and by 3 mm upward is determined, the print unit 130 generates the print data where the image is shifted by 2 mm leftward and by 3 mm downward in advance. This enables the misalignment of print position to be corrected. This print data is transferred to the printer driver PD, undergoes halftone processing and the like and then is sent to the inkjet printer PT.

Although the print unit 130 may generate the print data, where the amount of misalignment is reflected, to correct the print position, for example, the print unit 130 may transfer parameters representing the amount of misalignment to the inkjet printer PT, and thus the inkjet printer PT may correct the print position. The inkjet printer PT performs control of ink eject timing on the main scan and adjustment of a raster with which the printing operation is started, based on these parameters. This also enables the misalignment of print position to be corrected.

The calibration unit 120 prints a scale on an adjustment medium that has a shape identical to the CD-R and the like to determine the amount of misalignment of print position occurring when printing on the label surface. The calibration unit 120 includes a maker print unit 121, an overlapping point input unit 122 and a misalignment amount determination unit 123.

Figure 4:
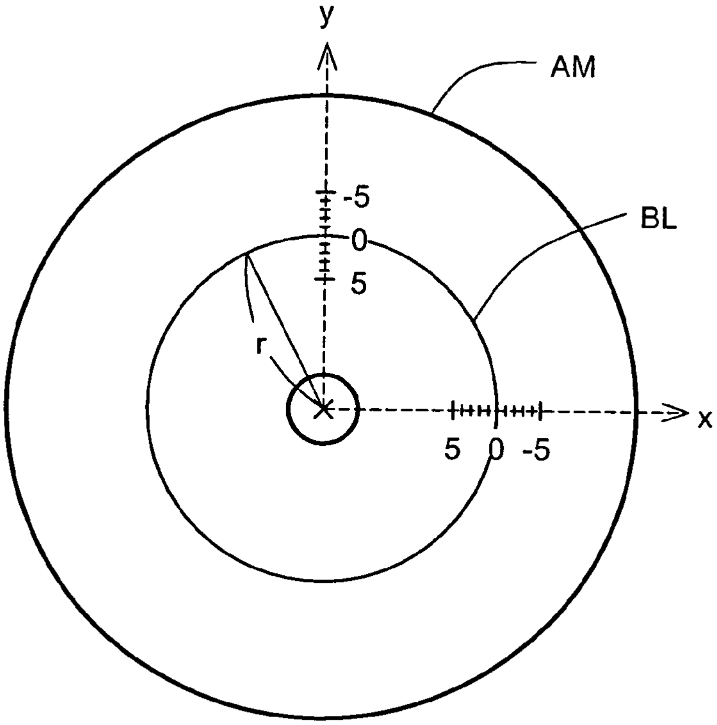
FIG. 4 is a plane view that shows an adjustment medium AM with a base line BL previously printed thereon.

FIG. 4 is a plane view that shows the adjustment medium AM with the base line BL previously printed thereon. The adjustment medium AM may include a cardboard that imitates the shape of CD-R and the like. The adjustment medium AM is preferably attached as an accessory of the inkjet printer PT on the factory shipment. The base line BL is a printed circle with radius r (mm) whose center is identical to that of the adjustment medium AM. The user mounts this adjustment medium AM on the tray and sets it to the paper feed slot of the printer PT.

The maker print unit 121 uses the inkjet printer PT to print the scale marks on predetermined positions of the adjustment medium AM. In this embodiment, the scale marks centered at the base line BL are printed between a position of r−5 (mm) and a position of r+5 (mm) on an x-axis and a y-axis of the adjustment medium AM at 1 mm intervals, as shown in FIG. 4. The x-axis and the y-axis are reference axes for determining the misalignment, and respectively correspond to a main-scan direction and a sub-scan direction that are used by the inkjet printer PT for printing. Of course the scale marks may be printed at finer intervals and/or more scale marks may be printed. When there is no misalignment of print position, the center ("0" shown in FIG. 4) of each scale on the x-axis and y-axis is printed at the position identical to the base line BL, as shown in FIG. 4. The axes shown by broken lines in FIG. 4 may or may not be printed.

Figure 5:
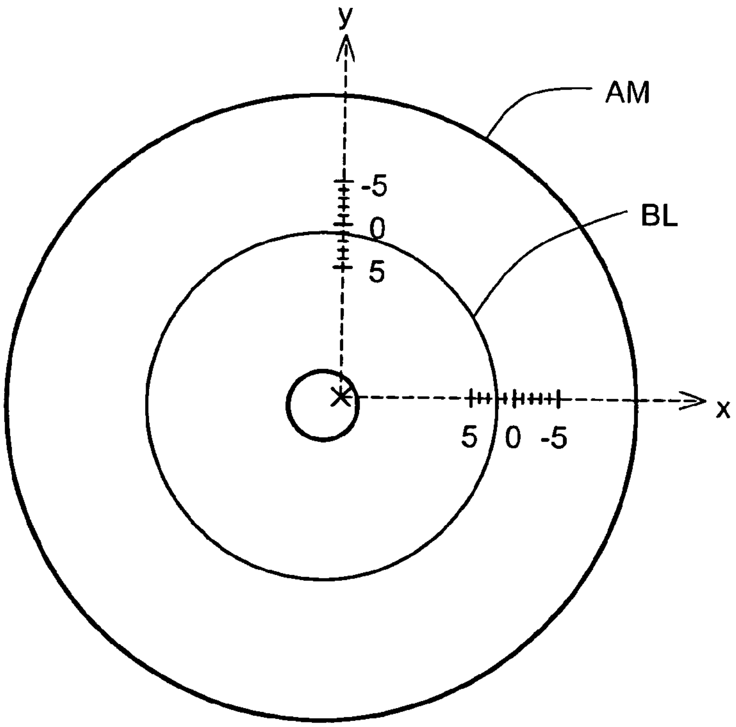
FIG. 5 is a schematic that shows one example of the printed scale marks in the case that the printing position is misaligned.

Meanwhile, FIG. 5 is a schematic that shows one example of the printed scale marks in the case that the print position is misaligned. In the inkjet printer PT, a constant misalignment of print position may occur according to each printer due to the manufacturing error of the tray, the fitting between the tray and the paper feed slot and the like. Thus, the scale marks may be printed on the positions shown in FIG. 5.

Figure 6:
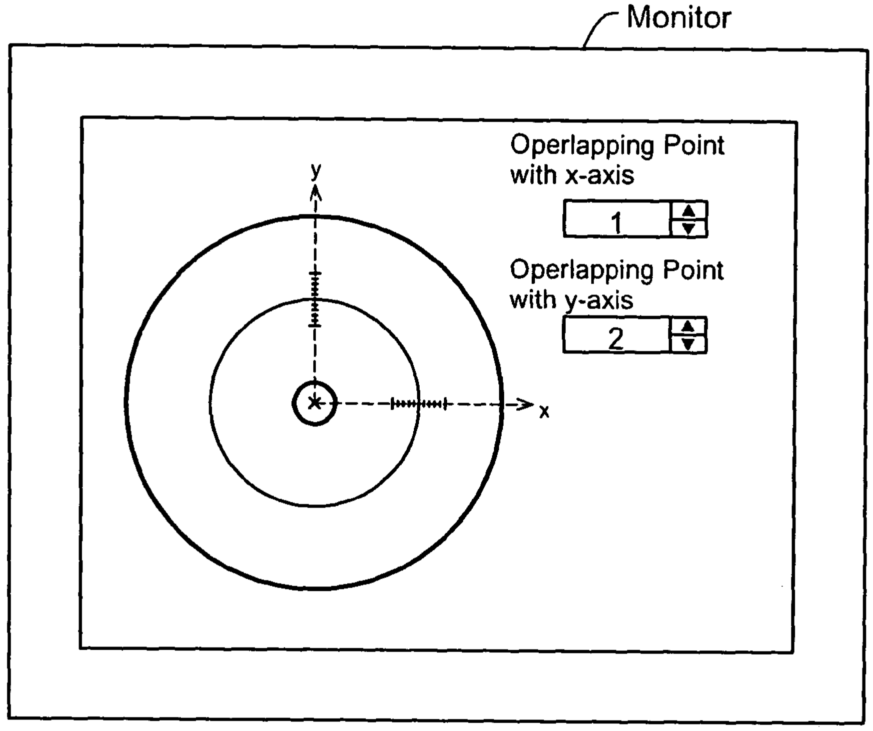
FIG. 6 is a schematic that shows one example of a user interface displayed on a monitor.

When such misalignment occurs, the user inputs the portions of the scales that overlap with the base line BL via a user interface provided on a monitor by the overlapping point input unit 122. FIG. 6 is a schematic that shows one example of such user interface displayed on the monitor. FIG. 6 shows the case of inputting "2" as the scale mark overlapping with the base line BL on the x-axis and "1" as the scale mark overlapping with the base line BL on the y-axis according to the misalignment shown in FIG. 5.

On this occasion, the user may read the value by eye if there is no scale mark overlapping with the base line BL. For example, when the base line BL is located between "1" and "2" on the x-axis, the user inputs a value such as "1.2" or "1.5" according to the position of the base line BL.

The misalignment amount determination unit 123 determines the amount of misalignment of print position based on the information input by the overlapping point input unit 122. The values input by the overlapping point input unit 122 represent the distances between the base line BL and the scale marks "0" of the respective axes at which the base line BL should be located. Therefore, these values can be determined to be the amounts of misalignment. In the case of FIG. 5, the amount of misalignment in the direction of the x-axis is 2 mm and the amount of misalignment in the direction of the y-axis is 1 mm.

Although the values printed on the adjustment medium AM represent the actual amounts of misalignment, the misalignment amount determination unit 123 may convert the value of the scale mark to the actual amount of misalignment, for example, the scale mark "1" to 0.2 mm and "2" to 0.4 mm. Alternatively, instead of the values, symbols such as "a" and "b" may be appended to the scale marks. In such cases, the misalignment amount determination unit 123 may determine the amount of misalignment based on the correspondences between the symbols and the amounts of misalignment, which are previously stored in a table and the like.

(A2) Process for Determining Amount of Misalignment

Figure 7:
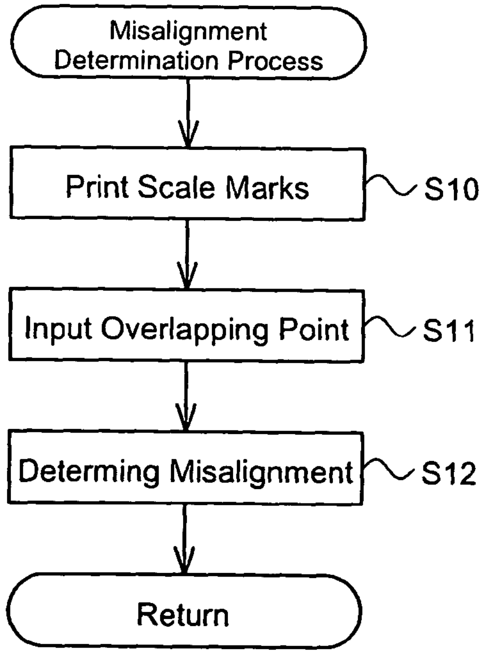
FIG. 7 is a flowchart that shows a process for determining an amount of misalignment.

FIG. 7 is a flowchart of a process for determining an amount of misalignment that is performed by the CPU of the personal computer PC according to the CD-R print software SW. This process is called by the user who uses the CD-R print software SW according to need. First, the CPU uses the inkjet printer PT to print the scale marks on the adjustment medium AM (step S10). Then, the user inputs the portion information on the scale marks overlapping with the base line BL (step S11). Finally, the CPU determines the amount of misalignment of print position based on the information input in step S11 (step S12). Subsequently, the CPU reflects this amount of misalignment to print the image or the like on the label surface.

Now, the CD-R print system 10 as the first embodiment has been described above. This first embodiment enables to readily determine the amount of misalignment of print position when directly printing on a label surface of CD-R and the like without using a rule and the like.

B. Second Embodiment

In the first embodiment, the scale marks are printed on the x-axis and the y-axis of the adjustment medium AM. In the second embodiment, the scale marks are printed on more axes in order to detect the amount of misalignment of print position with more accuracy. The system used in this embodiment has the same configuration with the CD-R print system 10 described in the first embodiment.

Figure 8:
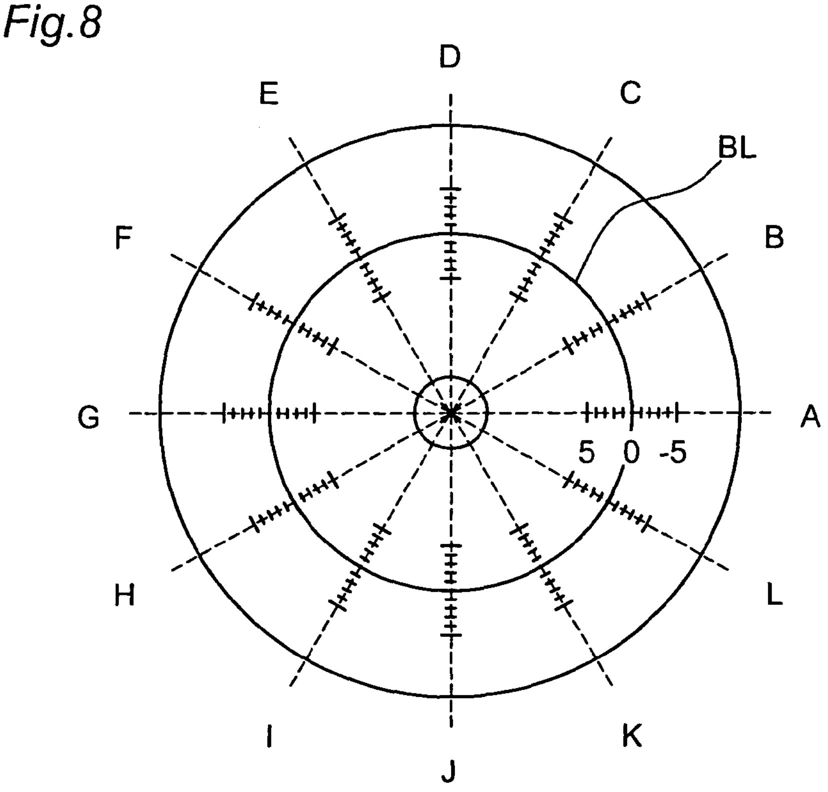
FIG. 8 is a schematic that shows the scale marks printed by a marker print unit 121.

FIG. 8 is a schematic that shows the scale marks printed by the marker print unit 121 in this embodiment. As shown in FIG. 8, in this embodiment, the scale marks are printed on the 12 axes with their centers identical to that of the adjustment medium, including the A-axis corresponding to x-axis and the D-axis corresponding to the y-axis in the first embodiment, which are arranged at angles differing by 30 degrees. Of course, the number of axes is not limited to 12. For example, the 8 axes arranged at angles differing by 45 degrees or the 24 axes arranged at angles differing by 15 degrees may be used. Furthermore, although the axes may be printed over the label surface of the adjustment medium AM, they may be partially printed, for example, on the upper half portion or the quarter portion of the adjustment medium AM.

Figure 9:
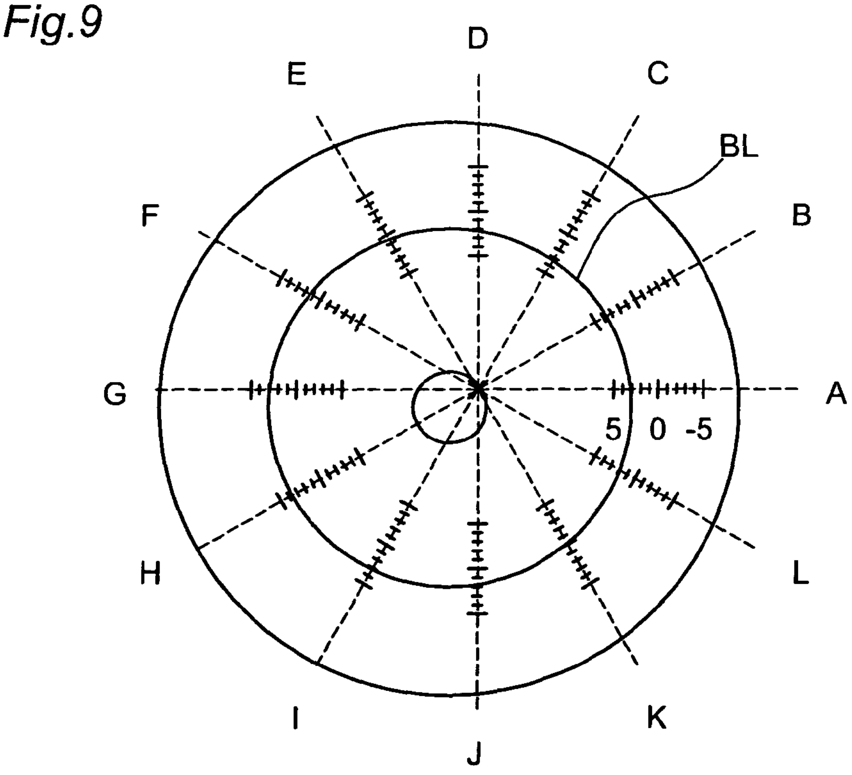
FIG. 9 is a schematic that shows one example of the printed scale marks in the case that the printing position is misaligned.
Figure 10:
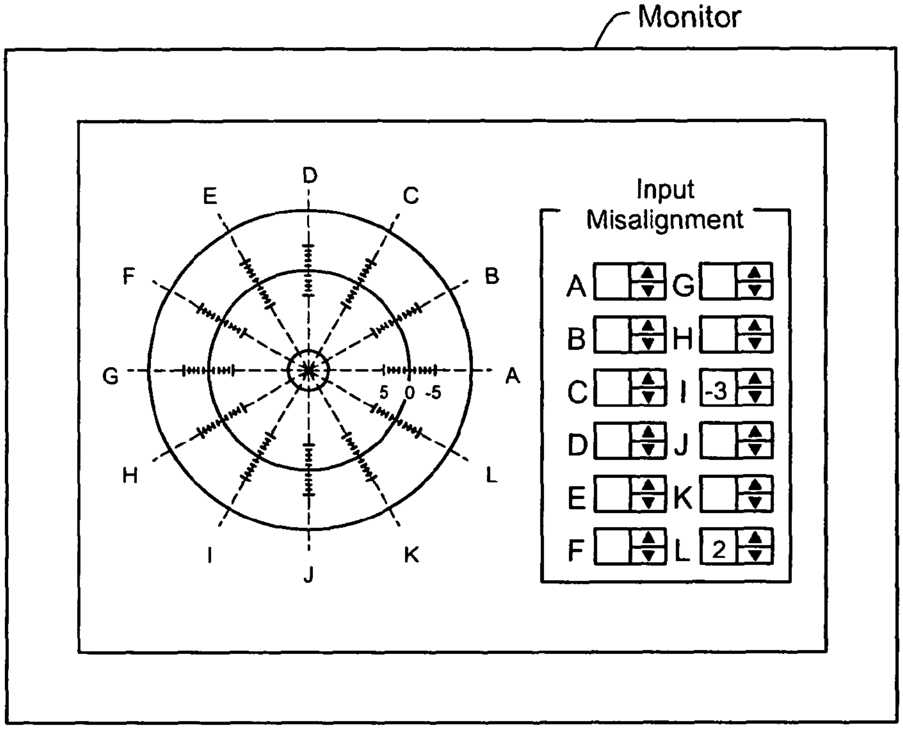
FIG. 10 is a schematic that shows one example of a user interface displayed on a monitor.

FIG. 9 is a schematic that shows one example of the printed scale marks in the case that the print position is misaligned. Where the scale mark "−3" on the I-axis and the scale mark "2" on the L-axis are printed on the base line BL. FIG. 10 is a schematic that shows one example of the user interface displayed on the monitor by the overlapping point input unit 122. Such user interface is provided with input boxes for every axis in which the portions of the scales overlapping with the base line BL are input. The misalignment amount determination unit 123 can receive at least two inputs from these input boxes to determine the amount of misalignment in the way described below. The scale marks overlapping with the base line BL may be input by clicking the appropriate portions on the scales of the axes displayed in the left side with the mouse.

Figure 11:
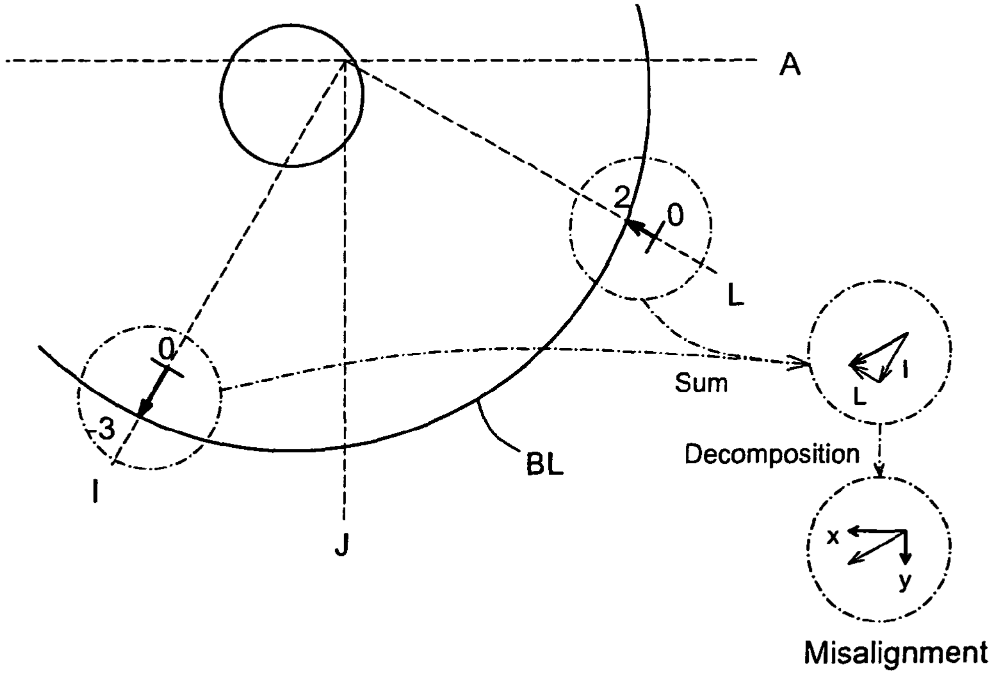
FIG. 11 is a schematic that shows a method of calculating an amount of misalignment.

FIG. 11 is a schematic that shows how the misalignment amount determination unit 123 calculates the amount of misalignment of print position based on the information input by the overlapping point input unit 122. FIG. 11 is an enlarged view of the area around the I-axis and the L-axis of FIG. 9. First, the misalignment amount determination unit 123 inputs at least two portions of the scales overlapping with the base line BL via the above-mentioned user interface. Then, the misalignment amount determination unit 123 obtains each vector from the absolute position at which the base line BL should be located, or the scale mark "0" of each axis, to each input scale mark. The misalignment amount determination unit 123 previously holds the absolute coordinates of the respective axes at which the base line BL should be located and the coordinates corresponding to the respective scale marks. The vectors can be obtained based on these coordinates. In the case of FIG. 9, the vector L from the scale mark "0" to the scale mark "2" on the L-axis and the vector I from the scale mark "0" to the scale mark "−3" on the I-axis are obtained. Then, the misalignment amount determination unit 123 obtains the total sum of the obtained vectors and calculates an x-component and a y-component of this sum. Of course, the misalignment amount unit 123 may calculate an x-component and a y-component of each vector and then sum the x-components and the y-components respectively. This enables the respective amounts of misalignment in the x-axis direction and in the y-axis direction to be calculated. The print unit 130 can cause the inkjet printer PT to print in consideration of the calculated amounts of misalignment so that the misalignment of print position is corrected.

According to the second embodiment described above, the user can select the scale marks overlapping with the base line BL from more scales. In other words, the user can select the most sensitive scales in response to the direction of misalignment. Therefore, the second embodiment enables to directly print on CD-R and the like with more accuracy than the first embodiment.

Figure 12:
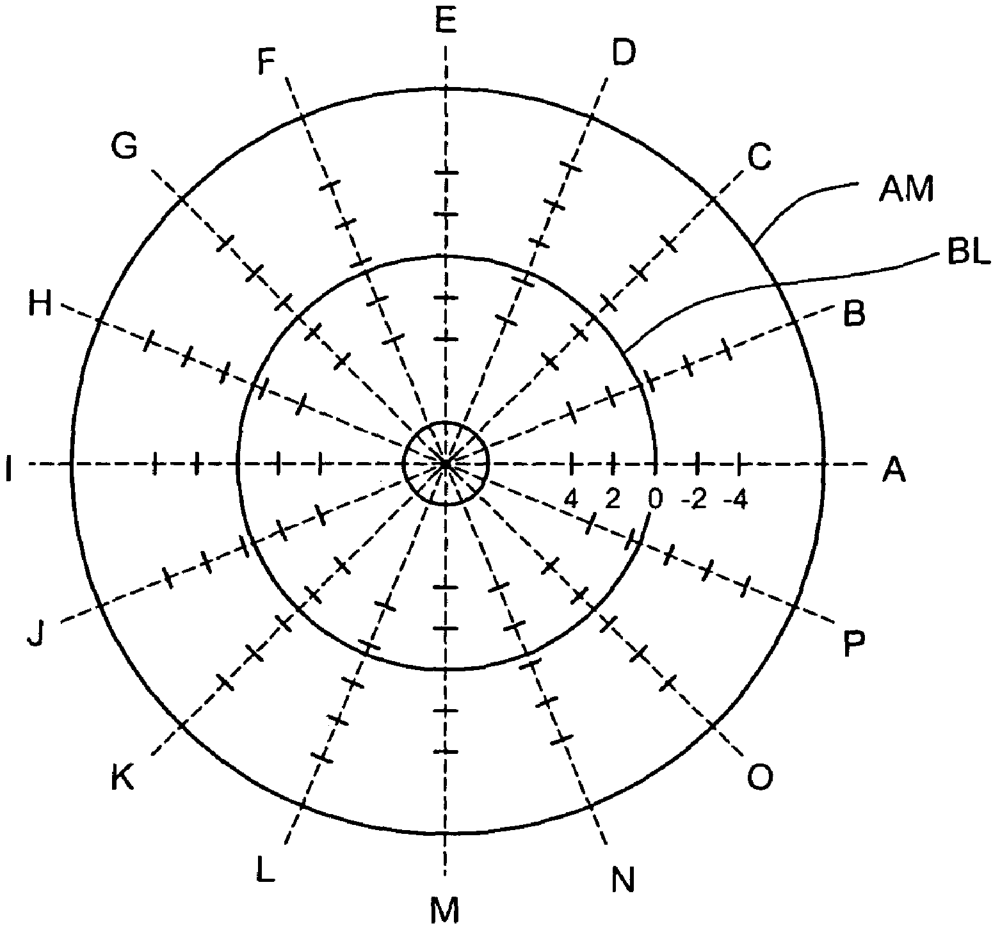
FIG. 12 is a schematic that shows another aspect of scale marks printed on the adjustment medium AM.

FIG. 12 is a schematic that shows another aspect of scale marks printed on the adjustment medium AM. In this aspect, each of the scale printed on the axes is shifted by a predetermined amount in its axis direction as its angle from the base axis, which is the A-axis, the E-axis, the I-axis or the M-axis, increases. The shift amount can be an amount that cannot be directly measured with a rule, for example, 0.1 mm. Although there is a limitation in fineness of the scale printed on the single axis, a plurality of scales that is different in distance from the center enables this problem to be substantially solved. Although there are shown the 16 axes from A to P in FIG. 12, it is preferable to provide more axes. This enables the user to select the scale marks overlapping with the base line BL with more fineness. Furthermore, shifting the scales by 1 mm or less enables the print position to be adjusted in a unit that is difficult to measure with a rule.

Although various embodiments of the invention have been described, the invention is not limited to these embodiments and may include various configurations without departing from the spirit of the invention. For example, the various processes described above may be implemented by software or hardware. In addition, the following modifications are applicable. Furthermore, the invention may be applied to adjustment of print position when printing on various printing media including a printing paper in addition to CD-R.

C. Modifications

Figure 13:
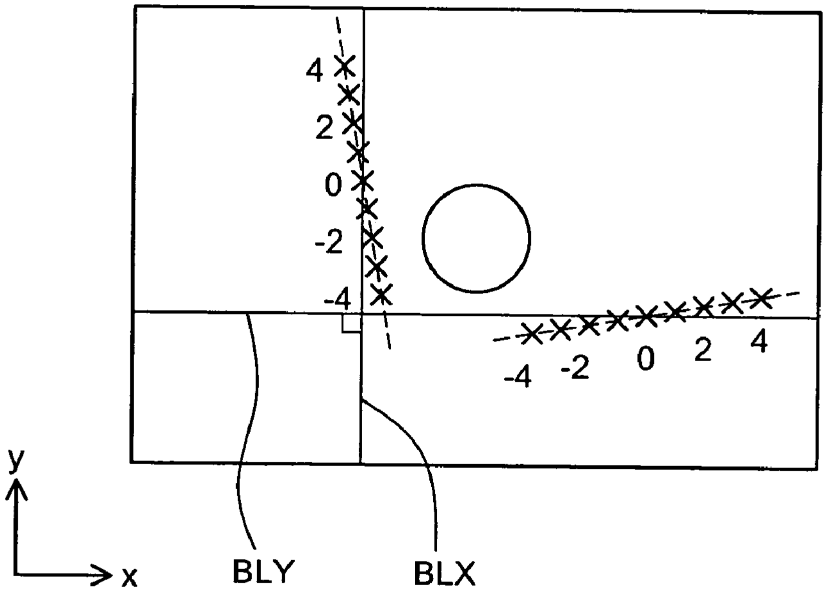
FIG. 13 is a schematic that shows one example of the base line and the scale marks previously printed on a business card-shaped CD-R.

FIG. 13 is a schematic that shows one example of the base line and the scale marks printed on the business card-shaped CD-R. In the example, the print position is not misaligned. The base line BLX for determining an amount of misalignment in the x-axis direction and the base line BLY for determining an amount of misalignment in the y-axis direction are previously printed on the CD-R. The marker print unit 121 prints a plurality of "X" marks as scale marks at regular intervals in the x direction and in the y direction on the straight lines intersecting with the respective base lines at a predetermined angle. The reason why the marks are arranged in this way is that more marks can be arranged than marks arranged on the straight lines perpendicular to the base lines.

Figure 14:
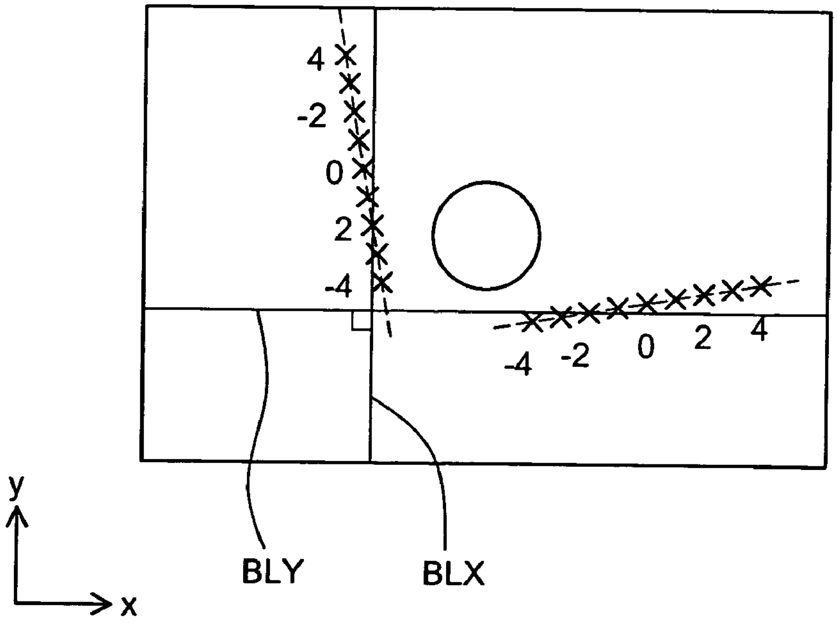
FIG. 14 is a schematic that shows one example of the printed scale marks in the case that the printing position is misaligned.

FIG. 14 is a schematic that shows one example of the printed scale marks in the case that the print position is misaligned in this modification. In FIG. 14, the base line BLX overlaps with the position of the scale mark "2" and the base line BLY overlaps with the position of the scale mark "−2." The user inputs portions of these scales via the overlapping point input unit 122. The misalignment amount determination unit 123 determines the amount of misalignment based on such portions and the positions at which the base lines should be located. As shown in FIG. 13, the base lines should overlap with the positions of "0" respectively, and therefore the amounts of misalignment in the x direction and in the y direction are determined to be 2 mm and −2 mm respectively if the values of the scale marks directly represent the amounts of misalignment. Of course, the values of the scale marks may be converted to another unit if they do not directly represent the amounts of misalignment. Alternatively, the table and the like, which previously relates the positions of the scales to the amounts of misalignment from the base lines, may be referred to.

The modification described above also enables an amount of misalignment of print position to be readily determined without using a rule and the like. However, the CD-R used in such modification should be set on its own tray suitable for its shape to prevent a misalignment other than those in the x-direction and in the y direction, for example, a misalignment due to rotation and the like.

What is claimed is:

1. A print controller for determining an amount of misalignment of print position on directly printing on a label surface of an electronic information recording medium, said print controller comprising:

a marker print unit for controlling a printing apparatus to print a marker at a predetermined position of an adjustment medium on which a base line is previously printed at a precise position to determine said amount of misalignment and which has a shape identical to said electronic information recording medium;

an input unit for inputting from a user at least two pieces of portion specifying information for specifying portions where said base line and said marker have a predetermined positional relationship; and a misalignment amount determination unit for determining said amount of misalignment based on the positional relationship between an absolute position at which said base line should be located and the portions specified by said portion specifying information, wherein one of said base line and said marker is a circle on said adjustment medium, and the other of said base line and said marker includes scale marks arranged at predetermined intervals on at least two axes that are directed from a center of said adjustment medium to a circumference of said adjustment medium and differ in direction, wherein said axes include two axes directed from the center of said adjustment medium to an x-direction and a y-direction that are reference directions for determining said amount of misalignment, wherein the marker print unit prints the scale marks as the marker on the adjustment medium, the adjustment medium having the circle previously printed thereon as the baseline, and wherein the scale marks on an axis directed to a direction other than said reference direction differ in distance from the center of said adjustment medium by a predetermined amount relative to the scale marks on said axes directed to said x-direction and said y-direction.

2. A print controller for determining an amount of misalignment of print position on directly printing on a label surface of an electronic information recording medium, said print controller comprising:

a marker print unit for controlling a printing apparatus to print a marker at a predetermined position of an adjustment medium on which a base line is previously printed at a precise position to determine said amount of misalignment and which has a shape identical to said electronic information recording medium;

an input unit for inputting from a user at least two pieces of portion specifying information for specifying portions where said base line and said marker have a predetermined positional relationship; and a misalignment amount determination unit for determining said amount of misalignment based on the positional relationship between an absolute position at which said base line should be located and the portions specified by said portion specifying information, wherein the marker print unit prints scale marks as the marker on the adjustment medium, the adjustment medium having two straight lines previously printed thereon as said base line, wherein said base line includes two straight lines in an x-direction and in a y-direction that are reference directions for determining said amount of misalignment, and said marker includes the scale marks arranged at predetermined intervals on a line that intersects with each of said straight lines at a predetermined angle.

* * * * *